United States Patent
Dubovský

(10) Patent No.: US 10,043,038 B2
(45) Date of Patent: Aug. 7, 2018

(54) IDENTIFYING PRIVATE INFORMATION FROM DATA STREAMS

(71) Applicant: JUMPSHOT, INC., San Jose, CA (US)

(72) Inventor: Jakub Dubovský, Fintice (CZ)

(73) Assignee: JUMPSHOT, INC., San Jose, CA (US)

( * ) Notice: Subject to any disclaimer, the term of this patent is extended or adjusted under 35 U.S.C. 154(b) by 112 days.

(21) Appl. No.: 14/990,495

(22) Filed: Jan. 7, 2016

(65) Prior Publication Data

US 2016/0203337 A1 Jul. 14, 2016

Related U.S. Application Data

(60) Provisional application No. 62/101,169, filed on Jan. 8, 2015.

(51) Int. Cl.
  *G06F 21/62* (2013.01)
  *G06F 17/30* (2006.01)

(52) U.S. Cl.
  CPC .... G06F 21/6263 (2013.01); G06F 17/30303 (2013.01); G06F 17/30516 (2013.01); G06F 17/30536 (2013.01)

(58) Field of Classification Search
  CPC ......... G06F 17/30303; G06F 17/30516; G06F 17/30536; G06F 21/6263
  See application file for complete search history.

(56) References Cited

U.S. PATENT DOCUMENTS

| | | | | |
|---|---|---|---|---|
| 8,272,051 B1* | 9/2012 | Zhao | | H04L 63/0245 713/153 |
| 8,898,272 B1* | 11/2014 | Young | | H04L 63/0407 709/223 |
| 9,392,075 B1* | 7/2016 | Radovnikovic | | G06F 21/31 |
| 2004/0199762 A1* | 10/2004 | Carlson | | H04L 63/0428 713/153 |
| 2006/0215298 A1* | 9/2006 | Itoi | | G06F 21/6263 360/60 |
| 2010/0011000 A1* | 1/2010 | Chakra | | G06F 19/322 707/E17.005 |
| 2011/0055914 A1* | 3/2011 | Sugahara | | G06F 17/30867 726/12 |
| 2011/0107190 A1* | 5/2011 | Henderson, Jr. | | G06F 11/10 714/798 |
| 2011/0126290 A1* | 5/2011 | Krishnamurthy | | G06F 21/6263 726/26 |
| 2011/0145715 A1* | 6/2011 | Malloy | | H04L 43/026 715/738 |
| 2012/0158626 A1* | 6/2012 | Zhu | | H04L 63/1408 706/13 |

(Continued)

OTHER PUBLICATIONS

Samantha Barnes, "Methods to Strip Queries from URLS in Google Analytics", Published Apr. 17, 2015, Retrieved From http://www.lunametrics.com/blog/2015/04/17/strip-query-parameters-google-analytics/.*

(Continued)

*Primary Examiner* — Chau Le

(74) *Attorney, Agent, or Firm* — Husch Blackwell LLP

(57) ABSTRACT

A method and apparatus for an automated classification of data in a data stream as private data includes receiving a data stream, parsing the data stream to determine parameter labels and parameter values; statistically analyzing the parameter labels and parameter value, and determining parameter labels corresponding to private data based on the analysis.

20 Claims, 4 Drawing Sheets

(56) References Cited

U.S. PATENT DOCUMENTS

| | | | |
|---|---|---|---|
| 2014/0026226 A1* | 1/2014 | Aoki | G06F 21/6245 |
| | | | 726/26 |
| 2014/0230066 A1* | 8/2014 | Hurwitz | H04L 63/102 |
| | | | 726/26 |
| 2014/0282464 A1* | 9/2014 | El-Gillani | G06F 8/61 |
| | | | 717/168 |

OTHER PUBLICATIONS

Barry Schwartz, "Google Launches Improved URL Removal Tool for Third-Party Content", Published Dec. 18, 2013, Retrieved From http://searchengineland.com/google-launches-improved-url-removal-tool-for-third-party-content-180223.*

Zhu et al., "Accessing and Extracting Data From Internet Using SAS", Alberta Health Service—Cancer Care, Edmonton SAS User Group (eSUG) Meeting, Published Oct. 26, 2011 (Year: 2011).*

* cited by examiner

| domain | param | mvpa | mgpv | uniqguids | dp | mvallen |
|---|---|---|---|---|---|---|
| booking.com | aid | 2.3 | 4.9 | 2918317 | 67364370 | 44.5 |
| booking.com | label | 2.5 | 3.0 | 2581519 | 59061575 | 73.1 |
| booking.com | dcid | 1.3 | 3.7 | 2373871 | 70779919 | 1.1 |
| booking.com | sid | 1.2 | 1.0 | 2367974 | 70705409 | 32.4 |
| booking.com | checkout_monthday | 1.8 | 99.7 | 1734729 | 23877093 | 1.8 |
| booking.com | checkin_year_month | 1.3 | 35.3 | 1734117 | 23868650 | 6.2 |
| booking.com | checkout_year_month | 1.3 | 16.1 | 1733656 | 23864365 | 6.2 |
| booking.com | checkin_monthday | 1.8 | 324.9 | 1733216 | 23745679 | 1.7 |
| booking.com | error_url | 3.5 | 1.1 | 1704455 | 13670910 | 410.6 |
| booking.com | dest_id | 1.9 | 6.8 | 1572315 | 19618583 | 7.1 |
| *booking.com* | *dest_type* | *1.1* | *330.9* | *1572154* | *19621547* | *4.4* |
| booking.com | si | 1.4 | 19.2 | 1444083 | 20115103 | 16.6 |
| *booking.com* | *city* | *1.9* | *6.5* | *1404771* | *16720393* | *7.5* |
| booking.com | group_adults | 1.2 | 5.1 | 1402034 | 15305401 | 1.5 |
| booking.com | no_rooms | 1.1 | 73.6 | 1389657 | 21655906 | 1.0 |
| booking.com | group_children | 1.1 | 25.9 | 1383888 | 15204203 | 1.0 |
| booking.com | src | 1.7 | 237.2 | 1355296 | 16172366 | 7.7 |
| booking.com | interval_of_time | 1.4 | 815.0 | 1344491 | 13450668 | 3.9 |
| booking.com | checkin | 1.8 | 5.8 | 1300677 | 31379907 | 10.1 |
| booking.com | ucfs | 1.0 | 458.5 | 1241288 | 24250815 | 1.0 |
| booking.com | checkout | 1.9 | 16.9 | 1240335 | 30137507 | 10.1 |

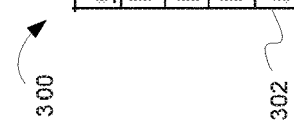

FIG. 3

IDENTIFYING PRIVATE INFORMATION FROM DATA STREAMS

CROSS-REFERENCE TO RELATED APPLICATION

This application claims the priority benefit of U.S. Provisional Application No. 62/101,169, filed Jan. 8, 2015. The disclosure of the above-referenced application is incorporated herein by reference in its entirety.

FIELD

The disclosure relates generally to systems and methods for processing data streams, and more particularly, to removing personally identifying information from data streams.

BACKGROUND

The Internet is a worldwide public system of computer networks providing information, shopping capabilities and other kinds of business opportunities accessible to tens of millions of people worldwide. The most widely used part of the Internet is the World Wide Web, often abbreviated "WWW" or simply referred to as just "the web." The web is an Internet service that organizes information through the use of hypermedia. The HyperText Markup Language ("HTML") is typically used to specify the contents and format of a hypermedia document (e.g., a web page). A client program, known as a browser, e.g. MICROSOFT® INTERNET EXPLORER®, GOOGLE® CHROME®, MOZILLA® FIREFOX®, APPLE® SAFARI®, runs on a user's computer and is used to issue requests to servers (i.e., web servers) that provide content of a web page and display it in human readable form. The request is typically in the form of a Uniform Resource Locator (URL) that identifies a web page or other information resource.

In addition to identifying a resource location, the URL may contain other information. In some cases, the information may be private information such as personal information, personally identifying information or other sensitive private information. Unscrupulous web sites or other parties may use the information in ways that a user may find objectionable or undesirable. As a result, it is often desirable to remove such information from data streams.

Conventional methods of removing private information typically involve removing (i.e., stripping) private information based on an explicit match or removing private information based on a set of rules.

In the case of removal based on explicit match, sets of private information can be provided by a third party source. This information usually includes full names, addresses, email addresses, credit card numbers, drivers license numbers, etc. When a URL is being stripped, each value contained in the URL is checked for a match to known private values. If the URL value matches, it is removed. This method is generally considered very weak and typically removes just a small fraction of private information. A majority of private information is unaffected. Thus, this method is typically inappropriate even with extensive tuning and a high number of external sources of private information.

Rules based removal is a slight generalization of the explicit match method described above. Rules based removal typically uses a list of manually created removal rules. The notion of a rule can be very general and therefore in theory, a removal rule can be generated for each type of private information. However, a weakness of this approach is the process of creation of the rules. There is usually no automatic mechanism for their creation. The rules are typically created either from a private information list as in the explicit match method described above or they are created manually by data analysts and aggregated over time. Thus, while this approach is more robust then the explicit match, it generally takes a lot of time and resources to develop a rule set that performs well. Moreover, the web based environment changes rapidly and thus substantial effort is typically required to keep the rules set up to date.

BRIEF DESCRIPTION OF THE DRAWINGS

For a better understanding of the inventive subject matter, reference may be made to the accompanying drawings in which:

FIG. 3 is a table illustrating various statistics used to analyze click streams according to embodiments.

DETAILED DESCRIPTION

Figure 1:
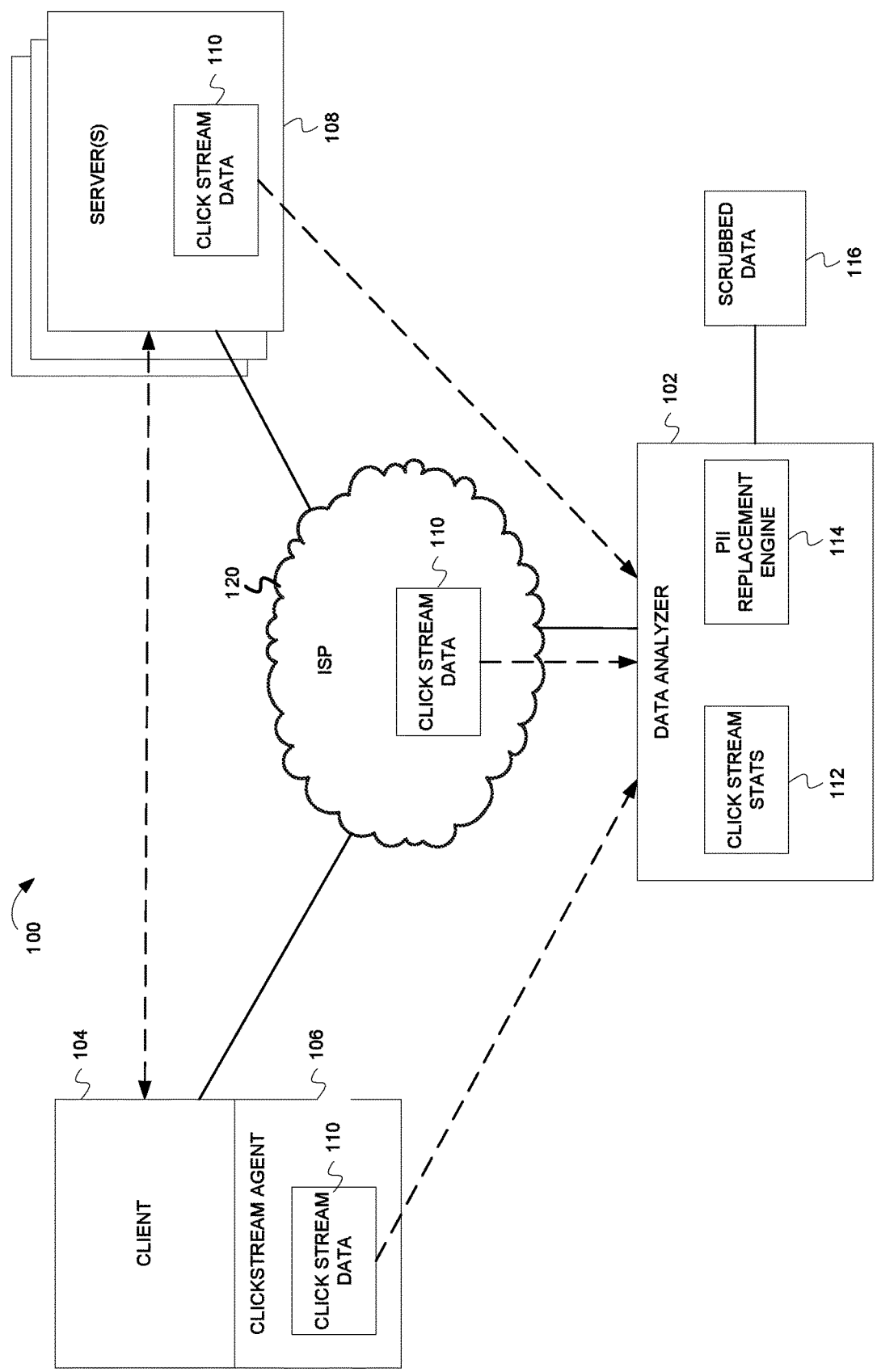
FIG. 1 is a block diagram of a system including client and backend systems for analyzing click streams according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic)

quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure includes systems and methods to automatically determine private information in data streams such as click streams. In some embodiments, click streams are collected. An analysis system parses the click stream into constituent parts and analyzes the constituent parts to determine various statistics from the click stream data. The statistics can be used to determine portions of a click stream that likely contain private data versus portions of the click stream that are not likely to contain private data. In some aspects, the click stream data may include a URL, a timestamp of the selection, and a user identifier. The user identifier has a nature of a hash and typically does not contain any private information about the user. However, if this is not the case and some private information can be derived directly from the user identifier it can be replaced by set of meaningless values used only to group user actions from one user together. Additionally, the timestamp is not private data.

However, the URL may contain private data. A URL, by its nature, should typically be used to identify a resource in the Internet. However, in many cases a URL may also contain other information including private information such as personal information and/or personally identifying information (PII). Private information can be explicit private information, implicit private information, or derived private information.

Explicit Private Information

A URL may contain explicit private information such as full name, birth date, email address, credit card number and so on. Explicit private information comprises information that can be understood and used without any additional data and/or knowledge of how the particular domain of the origin of the URL works.

The following URL is an example with of a URL with explicit private information:
    http://www.store.com/
        prodlist.aspx?Submit=ENE&N=2060&name=John Doe
In the example URL, a "name" parameter includes private information comprising a user's name "John Doe." In this case, the private information is PII.

Implicit Private Information

A part of a URL often carries some identifier (ID) of a user which is not directly interpretable. The identifier may be a customer id, a session ID or other type of identifier. Having only a number or a hash, it is typically not possible to determine a personal identification of what person performed a particular action. However, with suitable external information, such as knowledge of user logs or access to a user database of a domain of origin it can be easy to identify a particular person from the implicit private information in a URL. The following URL will be used as an example of the above:
    https://checkout.pay.store.com/ws/
        ISAPI.dll?sessionid=196124&pagename=cypsubmit
In the example URL above, it is not possible to obtain the identity of a user performing payment from the link itself. However, assume that an employee of the company having the domain "store.com" gets possession of click stream data. For example, the employee may have access to logs of the server processing payments and/or to a user database. Using the sessionid parameter value from the example click stream item, it is possible to find the particular transaction and thus the user performing that transaction. The employee can then obtain the name, surname, email, credit card number, address and potentially other personal information about the clicking user. This information would typically be already possessed by the company having the domain "store.com". But the problem is that now the private personal information is joined with the user ID in the click stream. The user ID was meaningless until the employee was able to join the click stream data with other data the employee has access to. This means that the employee can obtain the identity of clicking user for all his browsing history, not just clicks on the company website. For example, by obtaining the identity of a user paying on their web store, the employee can also find the identity of a user identified by particular user identification in the click stream. This is because other clicks in click stream with the same user identification can be assumed to have been made by the same user with the same identity no matter what domain the link belongs to.

Derived Private Information

Even if a URL does not contain explicit or implicit private information, it is possible in some cases to derive private information from a combination of parameters that display public behavior. The following URL will be used as an example:
    www.ownprofile.com/john.white
The example URL is from an imaginary social web site where one can create a profile and allow friends to see the content of the profile. This particular example URL points to a profile of user which registered to a user named John White. There is one parameter identifier in the example URL, the first segment of path (e.g., the "/" in the URL). This first parameter has a value "john.white". Because the example web site is a social web site many different people can access the example URL to view John White's profile. The viewers may include John's friends but may also include those who try to find his profile, for example by using a search service. From this observation it can be seen that the identity of a user cannot be derived just from the fact that he clicked the link. The viewer may be John himself or any other person visiting his profile.

Now consider the URL:
    www.ownprofile.com/john.white?edit=true
A new parameter called "edit" is observed in the example URL with value "true". For the purposes of this example, assume that the parameter has only two possible values ("true" and "false") so it is definitely not PII. There are now two parameters "/" and "edit" which are both public. Assume that it is learned that the presence of "edit=true"

means that the user is editing their profile. It is also known that only John White, as owner of the profile, can edit his profile, so he has to be logged in. That means that if some user visits the example URL it is highly probable that the visiting user is actually John White. This is a very basic example that shows that in general, private information can be hidden in a combination of information from parameters that have public behavior.

The systems and methods can be used to analyze high volumes of URLs appearing in click streams. The systems and method can automatically identify explicit private information, implicit private information, and private information hidden in combinations of parameters appearing in URLs as described above. Generally speaking, the systems and methods apply statistical analysis to identify those parameter values in a URL where the same value is seen by multiple users. If multiple users see the same value of a parameter then the parameter probably does not contain private information. After identifying portions of URLs that are likely to contain private information, the systems and methods can process the URLs to remove or obscure the private information.

There are various reasons why it is desirable to remove private information from click stream data. It is natural to protect the privacy of users which means discarding their names, addresses, credit card numbers, emails etc. URLs can also contain links to documents such as contracts, invoices etc. Those items may not be related to particular person, but often contain sensitive information. Moreover, some URLs may contain information which can be used to find the identity of a user and thus reveal the user's browsing history. Moreover, many countries impose strict rules about handling the PII of users. It is thus desirable to remove or obscure such information early in the process.

The systems and methods described herein allow for an automated and flexible means for detection of private information in data streams in the ever changing environment of the Internet. For example, the systems and methods described herein can adapt to newly emerging sites and changes in implementation of existing ones without significant human intervention.

FIG. 1 is a block diagram of a system 100 for determining potentially private information in a data stream such as a click stream. In some embodiments, the system 100 includes a data analyzer 102 that receives click stream data 110 from one or more of a client computer 104, server 108 and/or Internet Service Provider (ISP) 120 (also referred to as a network service provider). Client computer 104 can be a typical computer running using a Microsoft Windows, Apple Macintosh or any other operating system. Examples of such computers include desktop computers, laptop computers, tablet computers, set top boxes, etc. Additionally, the client computer can be a mobile phone, music player, or other intelligent device running a mobile operating system such as the Android operating system or IOS. The computer can have one or more different browsers. Examples of such browsers may include Microsoft Internet Explorer, Google Chrome, Mozilla FireFox, Apple Safari etc. The embodiments are not limited to any particular type or brand of browser. A user may utilize the browser to navigate to various web pages provided by a web server such as server 108. As the user clicks or otherwise selects a link, a request comprising click stream data 110 is generated. As noted above, the click stream can contain a URL, a timestamp of the selection, and a user identifier of a user making the request via the browser.

The click stream data 110 may be maintained on the user's client computer 104. In some aspects, the click stream data 110 may be maintained as part of a browser history. In alternative aspects, a click stream agent 106 may be installed on client computer 104 (with the user's permission, for example via an EULA (end-user license agreement). The client agent may gather the click stream data 110 based on the user's activities in a browser. The click stream data 110 may be transmitted to data analyzer 102 for processing per the operations described below. In some embodiments, the click stream agent 106 can be a one or more parameter values browser add-on (also referred to as a plug-in). In alternative embodiments, the click stream agent 106 can be an anti-malware or anti-virus program on a client computer. However, the inventive subject matter is not limited to browser add-ons or anti-malware/anti-virus programs. Those of skill in the art having the benefit of the disclosure will appreciate that a click stream agent 106 can be any type of program, add-on, extension or other unit of software that can access a click stream.

Other sources of click stream data 110 can include a server 108 or ISP 120. For example, server 108 may be a web server that receives requests in the form of click streams that contain URLs. Server 108 can store the received click streams and provide the click stream data to data analyzer 102. ISP 120 may monitor communications taking place between clients and server, and obtain click stream data 110 by looking for HTTP (Hyper Text Transfer Protocol) traffic in the communications. The click stream data 110 can then be provided to data analyzer 102.

Data analyzer 102 receives click stream data 110 from one or more sources (e.g., client computer 104, server 108, and/or ISP 120) and analyzes the click stream data to determine various click stream statistics 112 regarding the click URLs and URL parameters in the click stream data. The statistics can then be used to determine those parameters in URLs that are likely to contain private information such as PII or other sensitive information. A PII replacement engine can then operate on the click stream data to remove or obscure private information in the click stream data to produce scrubbed data 116. The data analyzer 102 can operate on any computing system that has access to the click stream data provided by click stream agents 106. The PII replacement engine can be filter software that is executed while exporting click stream data or software that processes click streams that are received after the data analyzer 102 has determined PII or other sensitive information.

Further details on the operation of data analyzer 102 are provided below with respect to FIG. 2 and FIG. 3.

Figure 2:
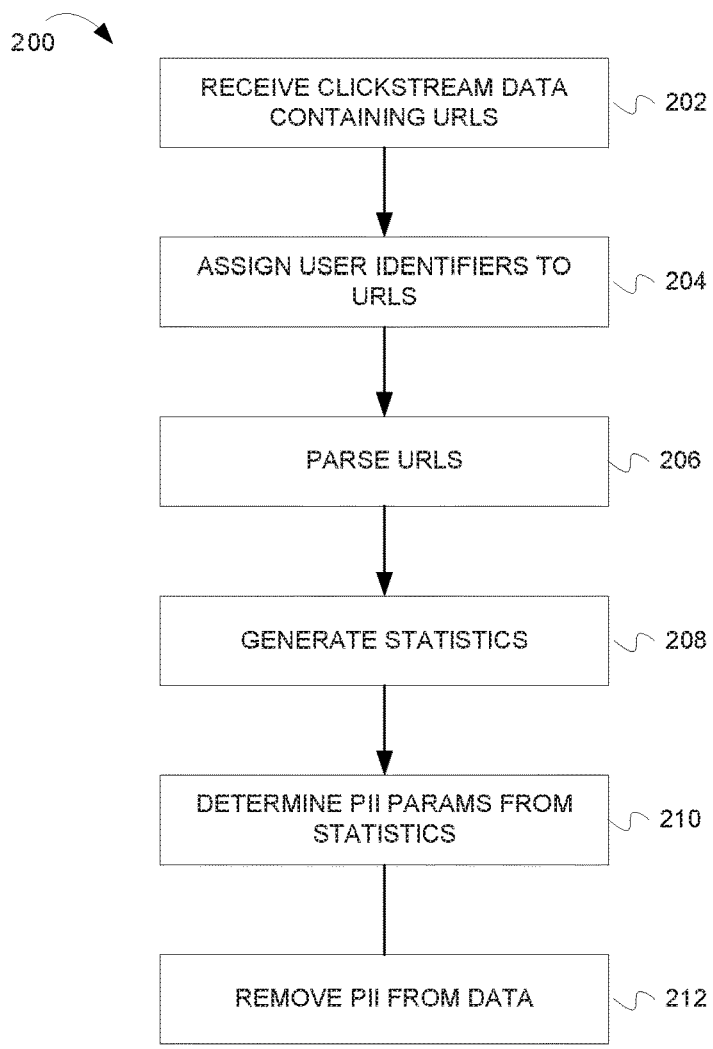
FIG. 2 is a flowchart illustrating example operations for a method for analyzing click streams according to embodiments.

FIG. 2 is a flowchart 200 illustrating example operations for a method for analyzing click streams according to embodiments. At block 202, a system executing the method (e.g., data analyzer 102) receives click stream data from one or more sources (e.g., client computer 104, server 108, and/or ISP 120). The as noted above, the click stream data can contain URLs, timestamps associated with the URLs, and user identifiers of users making requests for resources at the URLs.

At block 204, the URLs can be assigned user identifiers. It is desirable to associate a user identifier to a URL for the records to be analyzed. This identifier is usually meaningless in the sense that it does not contain a name or other means of identifying who the user actually is. Its only function is to identify a subset of all clicks which were made by the same otherwise anonymous user.

In some aspects, the assigned identifier does not need to be precise in a sense that every user has unique identifier. For the purposes of the method, one identifier can be assigned to a single user or to more than one user. Further, a user may even be assigned a different identifier over time. However, it is desirable to ensure that such changes be kept under reasonable threshold which retains significance. This can make implementation of user identifier easier. For example, a device ID can be used as a user identifier since on average there are not many users using the same device. The device identifier can be an identifier of a computer, an installation of a particular software component, a mobile device or other entity used to collect a data stream. Further, the user identifier can be a combination of more than one value.

At block 206, the URLs are parsed into constituent components. A URL can include various combinations of one or more of scheme name, user info, host name, port number, path, query, and fragment. A URL typically contains a host name, path and query. A scheme name generally has few possible values, for example "http://," "https://," "ftp://" etc. There is nothing to change by user in the scheme name, and it does not contain private information. User info is typically rare in URLs in the Internet context. User info typically contains a login and name of user to host computer. Thus, in some aspects, the user info is considered PII and is removed. Host name and port number usually do not change by user, however it possible that the host name and port number contains PII. The path, query and fragment components may change with different users and other contexts and usually contains private information such as PII.

URL components that may contain private information are referred to herein as a "parameter." A parameter in a URL can have a text string associated with the parameter that will be referred to as a value of the parameter. Common examples of different expressions of parameters and values in example URLs are as follows:

Query parameter—www.domain.com/dir/in.dexhtm?param=value
      parameter: param
      value: value
    Path segment—www.domain.com/dir/subdir/index.php
      parameter:/dir/
      value: subdir
    Parameter in path segment—www.domain.com/dir/a=foo1;b=foo2/index.htm
      parameter:/dir/b
      value: foo2
    Parameter in anchor—www.domain.com/index.htm#!par=val
      parameter: par
      value: val One of ordinary skill in the art having the benefit of the disclosure will appreciate that other forms of parameters and values are possible and within the scope of the inventive subject matter.

At block 208, the parsed click stream data is analyzed to determine statistics regarding the parameters and values of the URLs in the click stream data. Using the basic idea presented above, private parameters of URLs are identified by correlation between occurrence of their particular values and the particular user who saw it. If there are many users which saw the same value of parameter, then it is safe to consider the value to be public. If a majority of values of a parameter are public, it is safe to conclude that parameter does not contain PII. On the other hand, if it is determined that a vast majority of values of a parameter are seen by very few users, it may be likely that that the parameter contains private information.

This correlation can be measured by various statistics computed directly or indirectly from event stream data. The statistics can be a direct measure of correlation between user and value. Moreover there may also be additional statistics which do not directly describe correlation but help to find more information about the nature of values of a particular parameter. Example of such statistics are as follows:

mean number of values of parameter per user id
    mean number of user ids per value of parameters
    mean length of all values of parameters In some aspects, a determination is made to determine if these and other statistics are statistically significant. For example, other statistics can be computed such as:

number of unique users which seen the parameter
    number of URLs containing given domain and parameter These are just few examples of the statistics which can be used. Those of skill in the art having the benefit of the disclosure will appreciate that other statistics can be generated and that such statistics are within the scope of the inventive subject matter. In general the disclosed methods can use any form of aggregated value computed from a set of URLs which is descriptive about the nature of the values of some or all of the parameters in the set of URLs.

FIG. 3 includes table 300 where the columns and lines of table 300 provide an example of parameters and computed statistics for the parameter. Table 300 includes the following example columns:

domain—domain to which the parameter belongs
    param—name of the parameter
    mvpg—mean number of unique values of parameter seen by one user
    mgpv—mean number of unique users who have seen value of given parameter
    uniqguids—number of unique users who have seen some value of parameter
    dp—number of events in which parameter with any value was seen
    mvallen—mean length of values of parameter One of ordinary skill in the art will appreciate that the statistics computed at block 208 may also refer to measures that are more complex than one number. For example, the statistics can include a distribution of some other statistics in time.

As explained above, a combination of two or more parameters can also contain private information even if the individual parameters in the combination are not private by themselves. Thus, combinations of parameters (on a domain for example) can be analyzed in the same way as individual parameters are. That means similar statistics are computed for all those combinations. To compute statistics for combinations of parameters, the combination can be treated as a new "imaginary" parameter and all of the corresponding values as one new value. A list of possible combinations can be input to this method. Therefore, the term "parameters" includes both individual parameters and all their combinations.

Returning to FIG. 2, at block 210, the system uses the statistics computed at block 208 to determine parameters that are likely to contain private data such as PII. The filtering method reflects the basic concept of a private parameter having values correlated with a value of the user ID assigned at block 204. A non-limiting list of examples of filtering that may be used in various embodiments is as follows:

Filtering by constant using a particular threshold for a statistic to limit its acceptable levels in order to decide whether the parameter is public or private.

Distribution of value of some statistic in time describing the shape of distribution and then requiring the statistics to be the same or bounded by the distribution.

Histogram of values by users for statistics computed for every user it is possible to determine a histogram of values and use the histogram as target histogram or boundary.

In the example illustrated in Table 300 (FIG. 3), parameter SID in row 302 has been statistically identified as being PII. This is because for the vast majority of values of parameter, there was just one user seeing the value. This fact is concluded from mgpv being 1.0. Also this information is statistically significant because there were enough users using the parameter (uniqquids=1734729). If there had been very few users having the SID parameter in a click stream, e.g., three users, then there would not be a statistically valid reason for concluding that the SID was PII.

The parameters can be filtered using one or more of the above-described filtering methodologies based on the computed statistics.

While the operations of blocks 202-210 can automatically determine parameters that are likely to have private data, there may be a need to manually change some decision made using the automated operations described above. Depending on implementation of statistics computation and filtering, some embodiments provide configuration options to input exceptions that are checked for as part of the above-described automated operations. For example, a rules base can be configured to provide rules that define exceptions for particular parameters, values or combinations of parameters and values. The exceptions can be used to fine tune automatic determinations made by the data analyzer. Further, the exceptions can be used to define rules to determine PII that cannot be deteimined based on statistical analysis.

At block 212, the URLs in the click stream are processed to remove or obscure those parameter values where the method has determined that the parameter value is likely to contain private information. In some aspects, the parameter and value are not removed from the URL. Instead, the parameter value is replaced with non-private information. For example, the parameter may be replaced with a static keyword "PRIVATE". This preserves information about parameter presence in a URL, but the actual value is kept secret.

In alternative aspects, the parameter and value may be removed from the URL, resulting in a shorter URL. This can be advantageous if URL normalization is used.

In some aspects, URLs are normalized. Sometimes it is desirable to treat a URL purely as an identifier of location on the Internet. For example, in determining the answer to questions like "how many users visited this page?" and others queries, a location of the page is needed. However, URLs cannot typically be directly compared as strings. This is because a URL typically contains parts which identify the location on the Internet and parts which can identify the user issuing the query to the location. Thus, two or more URLs pointing to same page may not match because the URLs were visited in different contexts. A context includes but is not limited to identity of user, source of location (on which page the link was clicked), geographical location of user, user settings and others. Thus, the removal of private parameters can be used as part of a URL normalization. For example, removing private data as described herein can result in removal of parts of a URL that identify context, thus obtaining a "pure" location identifier.

It should be noted that some or all of the operations 202-212 can be performed in parallel with one another (for example, on different batches of data) and may be performed in different orders. For example, the computation of statistics at block 208 can be continuous, batched or on demand depending on volume of data and degree of variability in the click stream data. The results of batched computation can be stored in a file, database, or some other means of storage. The results of continuous and on demand computation can be cached, with an entry being removed from the cache after some time to permit adaptation.

Similarly, the filtering of the statistics to determine private parameters can be performed in a batch mode, continuous update or on demand. The results of the filtering can be stored permanently until a next batch of click stream data is processed for example.

Additionally, it should be noted that the systems and methods described herein are not limited to processing click stream data. One of skill in the art having the benefit of the disclosure will appreciate that the aspects of the disclosure can be used for a general action stream or static data set containing user id, device ID or some form of user identification coupled with data containing potentially private information.

Figure 4:
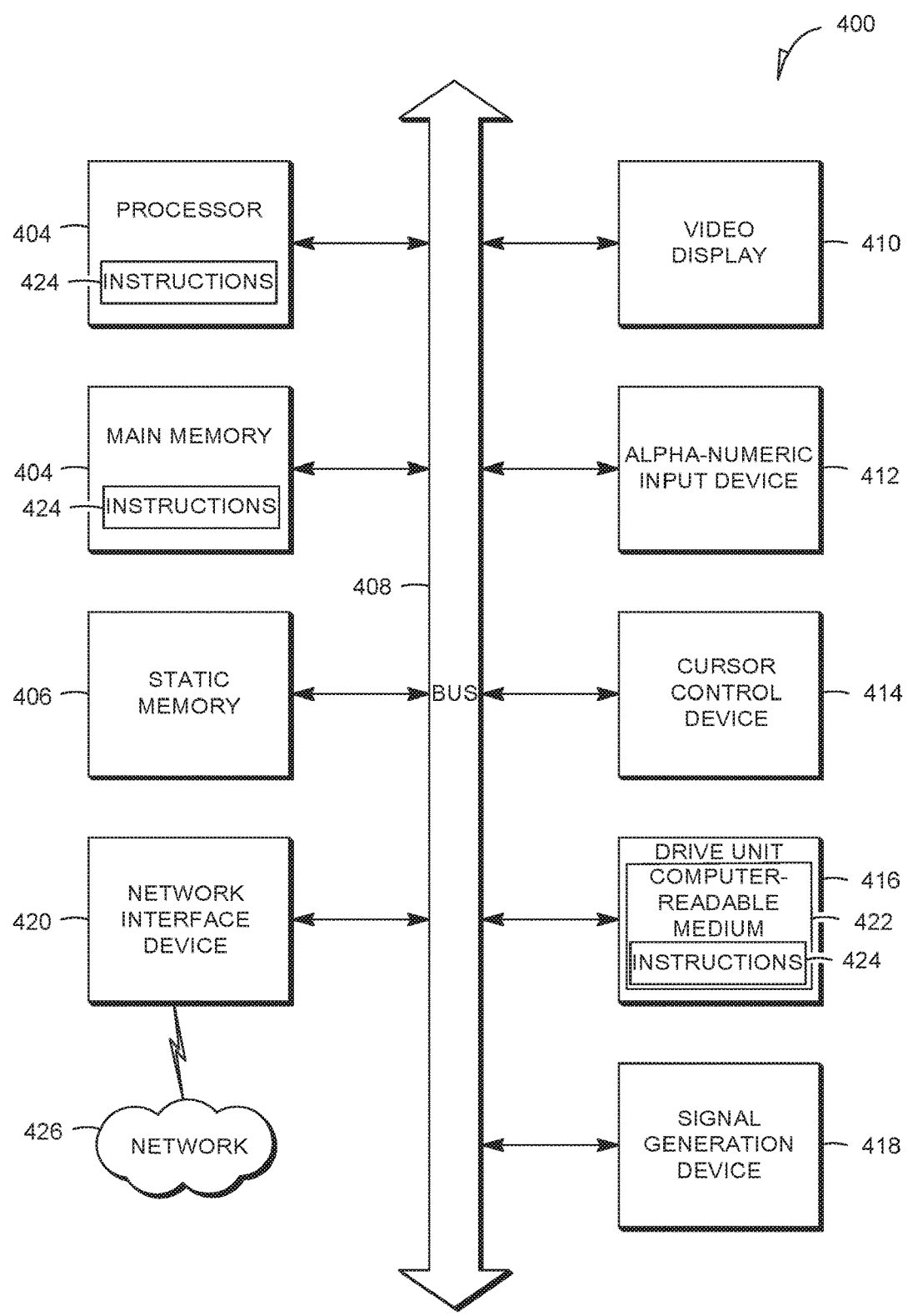
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to both servers and/or remote clients.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for detecting personal information, the method comprising:
receiving into a non-transitory machine-readable medium a data stream having a plurality of entries;
parsing, by one or more processors, the data stream to determine one or more parameter labels and one or more parameter values in an entry of the plurality of entries;
combining first parameter values having a first parameter label with second parameter values having a second parameter label to create combined parameter values;
assigning an identifier to a subset of the plurality of entries, the identifier corresponding to a device or user associated with the subset of the plurality of entries;
analyzing the identifier, the one or more parameter labels, the one or more parameter values, and the combined parameter values to determine a set of statistics for the data stream; and
determining based, at least in part, on the set of statistics, if the combined parameter values correspond to private data, wherein the first parameter values and the second parameter values are not indicated as private data.

2. The method of claim 1, further comprising modifying one or more parameter values for the one or more parameter labels that correspond to private data.

3. The method of claim 2, wherein modifying a parameter value includes removing the parameter value from a Uniform Resource Locator (URL).

4. The method of claim 2, wherein modifying a parameter value includes replacing the parameter value with non-private information.

5. The method of claim 1, wherein the analyzing includes:
in response to determining that a plurality of different user identifiers have a different parameter value for a same parameter label, designating the parameter label as corresponding to private data.

6. The method of claim 1, wherein the analyzing includes:
in response to determining that a plurality of different user identifiers have a same parameter value for a same parameter label, designating the parameter label as not corresponding to private data.

7. A system comprising:
one or more processors;
a machine-readable medium coupled to the one or more processors, the machine-readable medium having stored thereon instructions, that when executed, cause the one or more processors to:
receive a data stream having a plurality of entries;
parse the data stream to determine one or more parameter labels and one or more parameter values in an entry of the plurality of entries;
combine first parameter values having a first parameter label with second parameter values having a second parameter label to create combined parameter values;
assign an identifier to a subset of the plurality of entries, the identifier corresponding to a device or user associated with the subset of the plurality of entries;
analyze the identifier, the one or more parameter labels, the one or more parameter values, and the combined parameter values to determine a set of statistics for the data stream; and
determine based, at least in part, on the set of statistics, if the combined parameter values correspond to private data, wherein the first parameter values and the second parameter values are not indicated as private data.

8. The system of claim 7, wherein the instructions further include instructions to modify the one or more parameter values for the one or more parameter labels that correspond to private data.

9. The system of claim 8, wherein the instructions to modify the one or more parameter values for the one or more parameter labels include instructions to remove a parameter value from a URL.

10. The system of claim 8, wherein the instructions to modify the one or more parameter values for the one or more parameter labels include instructions to replace a parameter value with non-private information.

11. The system of claim 7, wherein the instructions to analyze include instructions to, in response to a determination that a plurality of different user identifiers have a different parameter value for a same parameter label, designate the parameter label as corresponding to private data.

12. The system of claim 7, wherein the instructions to analyze include instructions to, in response to a determination that a plurality of different user identifiers have a same parameter value for a same parameter label, designate the parameter label as not corresponding to private data.

13. The system of claim 7, further comprising a browser add-on for a browser, wherein the browser add-on supplies the data stream.

14. The system of claim 7, further comprising a network service provider, wherein the network service provider supplies the data stream.

15. A non-transitory machine-readable medium, the machine-readable medium having stored thereon instructions, that when executed, cause one or more processors to:
receive a data stream having a plurality of entries;
parse the data stream to determine one or more parameter labels and one or more parameter values in an entry of the plurality of entries;
combine first parameter values having a first parameter label with second parameter values having a second parameter label to create combined parameter values;
assign an identifier to a subset of the plurality of entries, the identifier corresponding to a device or user associated with the subset of the plurality of entries;
analyze the identifier, the one or more parameter labels, the one or more parameter values, and the combined parameter values to determine a set of statistics for the data stream; and
determine based, at least in part, on the set of statistics, if the combined parameter values correspond to private data, wherein the first parameter values and the second parameter values are not indicated as private data.

16. The non-transitory machine-readable medium of claim 15, wherein the instructions further include instructions to modify the one or more parameter values for the one or more parameter labels that correspond to private data.

17. The non-transitory machine-readable medium of claim 16, wherein the instructions to modify the one or more parameter values for the one or more parameter labels include instructions to remove a parameter value from a URL.

18. The non-transitory machine-readable medium of claim 16, wherein the instructions to modify the one or more parameter values for the one or more parameter labels include instructions to replacing a parameter value with non-private information.

19. The non-transitory machine-readable medium of claim 15, wherein the instructions to analyze include instructions to, in response to a determination that a plurality of different user identifiers have a different parameter value for a same parameter label, designate the parameter label as corresponding to private data.

20. The non-transitory machine-readable medium of claim 15, wherein the instructions to analyze include instructions to, in response to a determination that a plurality of different user identifiers have a same parameter value for a same parameter label, designate the parameter label as not corresponding to private data.

* * * * *